March 19, 1935. R. C. INGERSOLL ET AL 1,995,149
APPARATUS FOR ROLLING TAPERED METAL ARTICLES
Filed Oct. 5, 1931 9 Sheets-Sheet 7

Fig. 9.

Inventors
Roy C. Ingersoll,
Stewart S. Battles.
Charles Allen
Attys.

Patented Mar. 19, 1935

1,995,149

UNITED STATES PATENT OFFICE 1,995,149

APPARATUS FOR ROLLING TAPERED METAL ARTICLES

Roy C. Ingersoll and Stewart S. Battles, Chicago, Ill., assignors to Ingersoll Steel & Disc Co., Chicago, Ill., a corporation of Illinois Application October 5, 1931, Serial No. 566,951

19 Claims. (Cl. 80—16)

This invention relates to a method and apparatus for rolling tapered metal articles, and constitutes an improvement on the apparatus shown in the copending application of Roy C. Ingersoll, Serial No. 507,576, filed January 9, 1931.

The improvements consist primarily in rolling the disk a second time upon segments that overlap adjacent segments that were first rolled and to this end there has been provided automatic means for controlling the indexing mechanism.

Further improved means resides in braking mechanism for the work holder for preventing accidental movement thereof at predetermined points.

Other improved features will be apparent from the following description.

The invention comprises the novel method, structure and combination of parts hereinafter described and more particularly pointed out and defined in the appended claims.

In the accompanying drawings which illustrate a preferred form of this invention and in which similar reference numerals refer to similar features in the different views.

Figure 1:
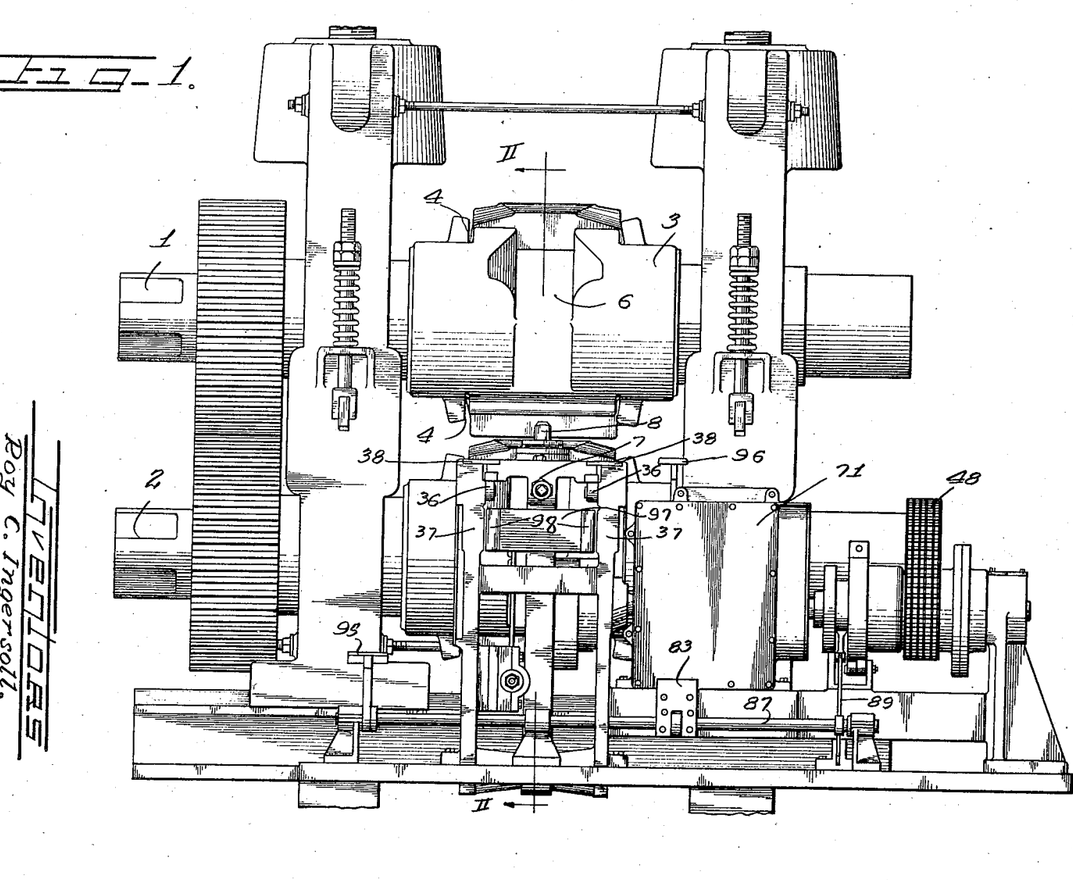
Figure 1 is a front elevational view of a disk rolling machine involving this invention.
Figure 2:
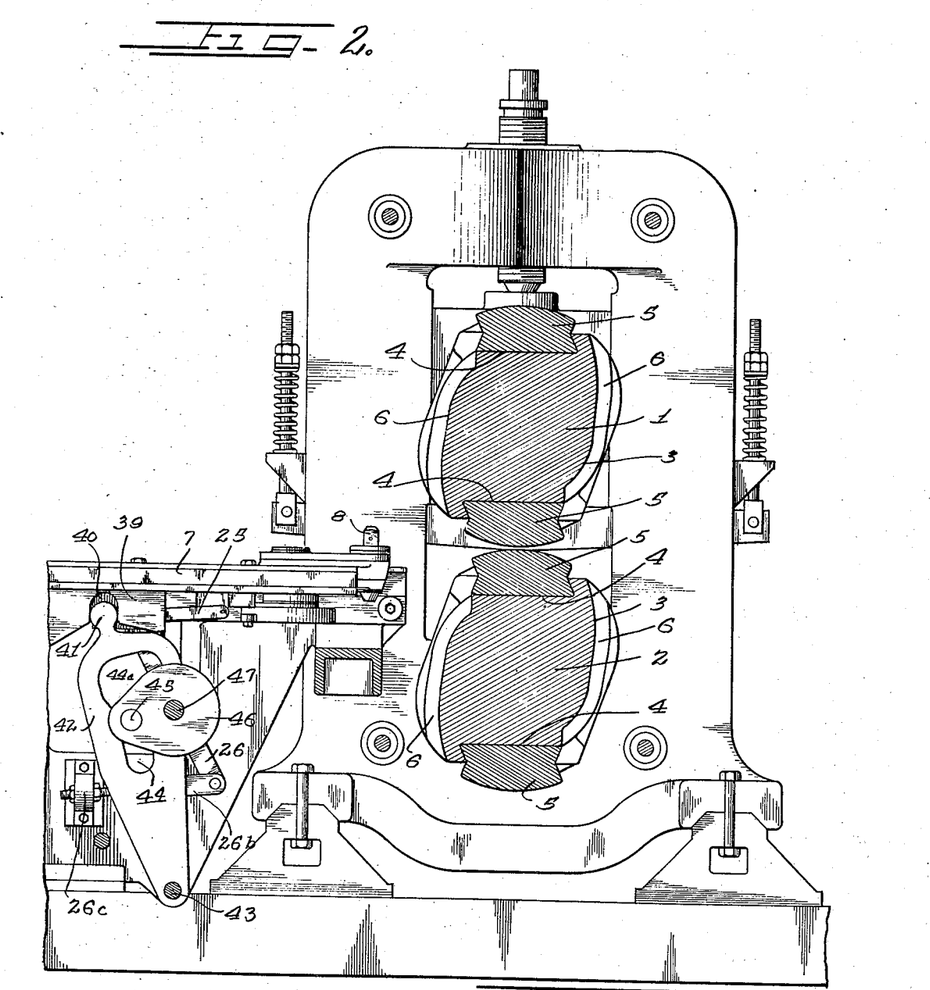
Figure 2 is a sectional view taken upon the line II—II of Figure 1.
Figures 3, 4:
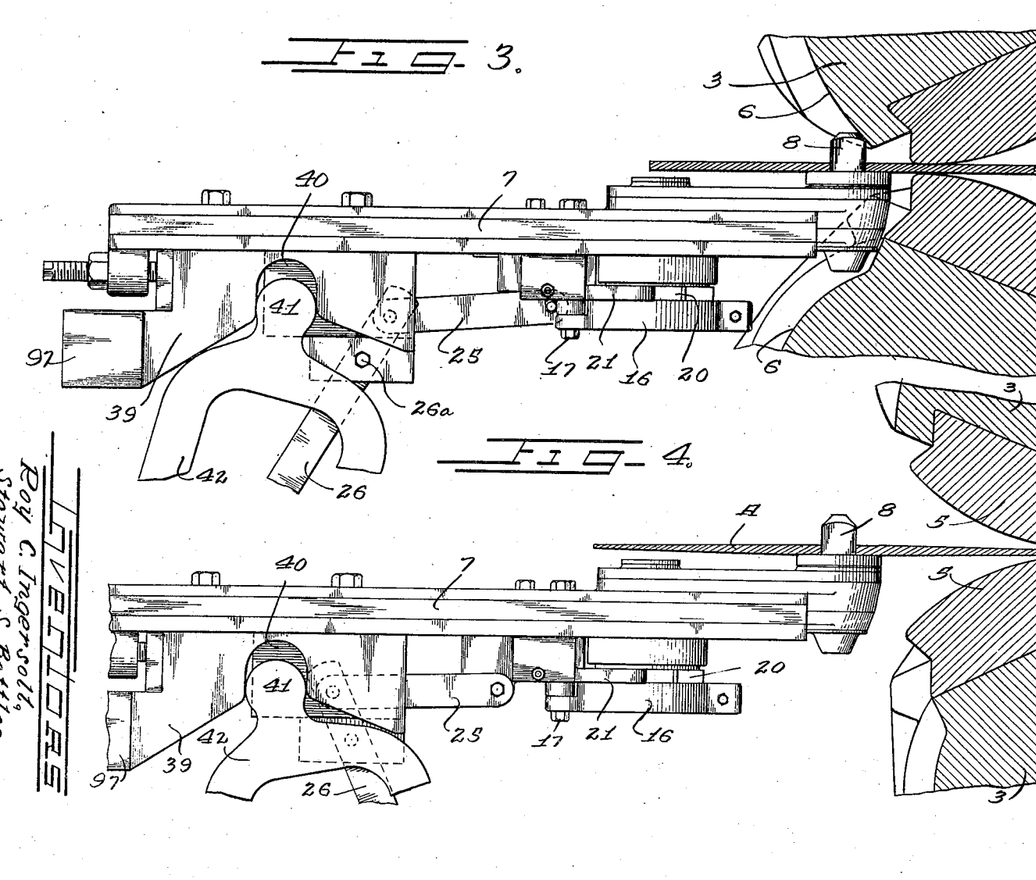
Figure 3 is an enlarged fragmentary sectional view through the rolls and the rolled article showing the carriage or work holder in elevation illustrating the initial positions of the rolls.
Figure 4 is a view similar to Figure 3 illustrating the final position of the rolls and the carriage.
Figures 13, 14, 15:
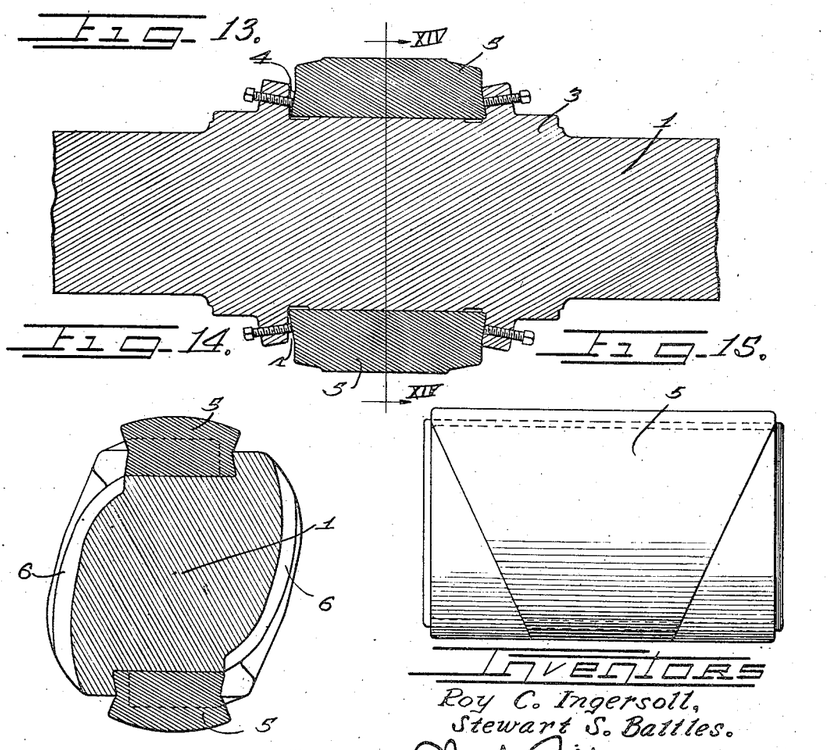
Figure 13 is an enlarged fragmentary longitudinal section through one of the roll shafts.
Figure 14 is an enlarged sectional view taken upon the line XIV—XIV of Figure 13 looking in the direction of the arrows.
Figure 15 is an elevational view of the face of one of the gap rolls.

In the drawings, Figures 1, 2 and 13, there is shown a disk rolling machine in which two shafts 1 and 2 are suitably journaled. These shafts are provided with enlarged central portions 3 which are provided with diametrically opposite pockets or recesses 4. Suitable roll blocks 5 are mounted and suitably anchored in these recesses. The sides of the enlarged portions 3 are cut out as indicated at 6 in alinement with the roll blocks 5 to provide proper clearance for the work holder or carriage. The roll blocks have substantially a triangular outer face as shown in Figure 15 due to the fact that the segments of the disks increase outwardly. The roll blocks in connection with each shaft constitute gap rolls for rolling and tapering metal articles such as metal disks. In the present instance, the machine is designed for rolling metal disks and in referring to Figures 3 and 4, it will be noted that a metal disk represented by the numeral A has been illustrated in connection with the gap rolls.

Figure 12:
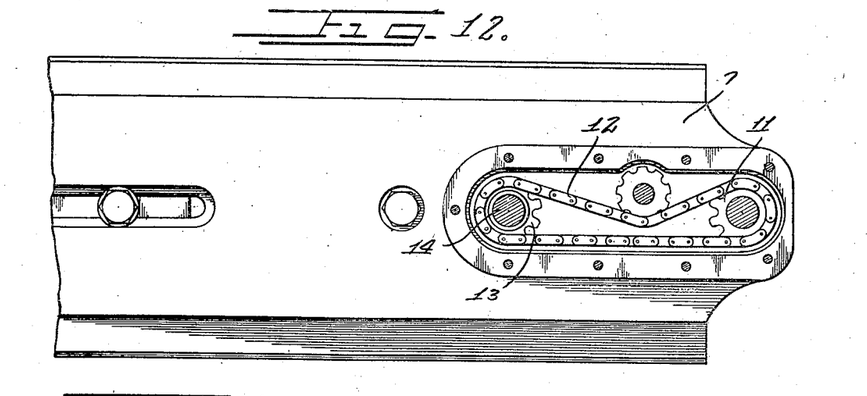
Figure 12 is an enlarged fragmentary view taken upon the line XII—XII of Figure 9 looking in the direction of the arrows.

The disk A is mounted upon a polygonal stud 8 which is rotatably mounted upon the forward end of a reciprocating carriage 7 and constitutes a part thereof. In order that the stud may rotate, it is secured to the upper end of a vertical shaft 9 (Figure 9) which is journaled in the carriage by means of the bearing collars 10 which engage in suitable bearing recesses in the carriage. Intermediate the bearing collars 10, the shaft 9 is provided with a sprocket 11 (Figure 12). A sprocket chain 12 is trained over the sprocket 11 and also over a sprocket 13 secured upon a vertical shaft 14 suitably journaled in the carriage.

The shaft 14 projects below the carriage and has a brake drum 15 secured thereto. A pair of brake shoes 16 pivoted upon a bolt 17 upon the carriage surround the brake drum. These brake shoes are connected by a bolt 18 having a coil spring 19 (Figure 10) thereon which yieldingly presses the free ends of the brake shoes toward each other.

A ratchet wheel or ring 20 is loosely mounted upon the brake drum. A pawl 21 (Figure 10) is adapted for engaging the ratchet wheel 20 during each forward reciprocation of the carriage for advancing or rotating the shaft 14 and the stud 8 one step. The pawl 21 is pivoted in a recess in a slide 22 and a coil spring 23 mounted in a socket in the wall of said recess urges the pawl against the ratchet.

Figure 11:
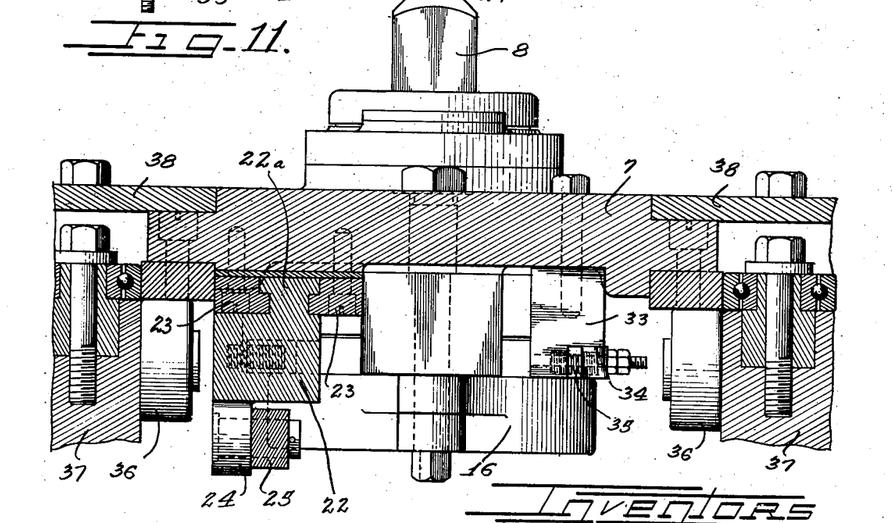
Figure 11 is an enlarged sectional view taken upon the line XI—XI of Figure 9.

The slide 22 is slidably supported upon the bottom of the carriage as shown in Figure 11. To this end it has a T-head 22ᵃ at its top portion that travels in a guideway formed by the rabbeted guide blocks 23 attached to the bottom of the carriage. The slide block 22 has a lower lug 24 to which one end of an operating link 25 (Figure 9) is pivoted. The other end of the link 25 is pivoted to a lever 26 which is actuated during the reciprocation of the carriage for operating the slide 22 and advancing the pawl 21. To this end, the lever 26 is pivoted to a support on the bottom of the carriage as indicated at 26ᵃ (Figure 9) and is pivoted at its lower end to one end of a rod 26ᵇ. The other end of the rod 26ᵇ is swivelled in a suitable bearing 26ᶜ on the frame.

Figure 10:
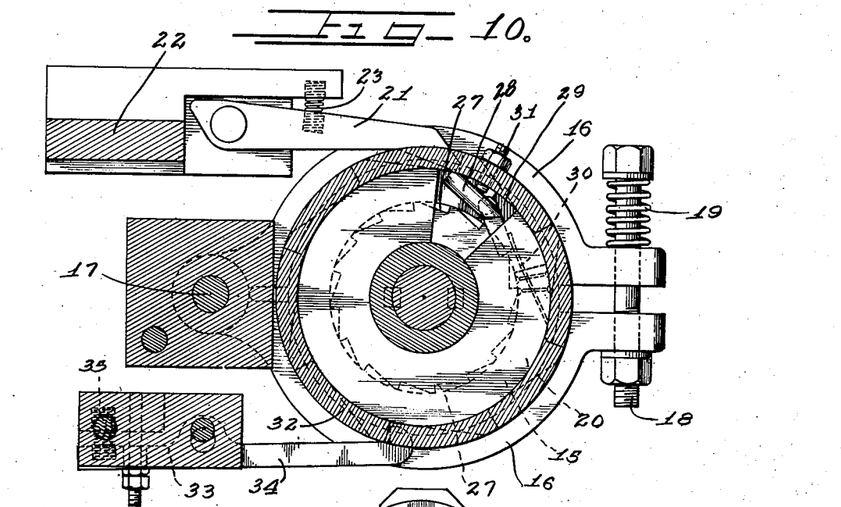
Figure 10 is an enlarged fragmentary sectional view taken upon the line X—X of Figure 9.

In order that the loose ratchet ring 20 may rotate the brake drum 15 and the shaft 14 connected therewith, a connection has been provided between such ratchet ring and drum that has a slip or skip at the end of each rotation of the ratchet ring. This connection consists of ratchet teeth 27 upon the hub of the drum and a pawl 28 (Figure 10) pivoted intermediate to a block 29 carried upon the ratchet ring 20 which is provided with a recess or chamber as shown in Figure 10 for housing the pawl 28. This pawl 28 is made thinner at its forward end to engage behind the wall in advance of the chamber. A leaf spring 30 suitably sustained by the ring 20 normally urges the pawl 28 into engagement with the ratchet teeth 27.

A cam screw 31 extends through the flange of a stationary cup shaped member 32 attached to the bottom of the carriage. It will be noted that the flange of this cup shaped member surrounds the ratchet teeth 27 so that the inner end of the screw lies in the path of the tail of the pawl 28. A block 33 which is secured to the bottom of the carriage pivotally supports a holding pawl 34 that engages the ratchet ring 20. The pawl 34 has a lost motion pivotal connection with the block 33 and the tail thereof is engaged by a spring 35 for urging the holding pawl against its ratchet.

It will be evident that during each revolution of the ratchet ring 20, the tail of the pawl 28 will ride under the screw 31 and be disengaged from the ratchet teeth 27 and after the screw has been passed, the leaf spring 30 will engage the pawl 28 with the teeth 27 again. However, the pawl 28 will be held idle until a tooth on the ratchet 27 has been skipped. The parts are so designed that the pawl 28 will be disengaged by the screw 31 when a disk has been rolled the first time. According to this invention, it is desired to roll the disk a second time and it is desired at this second rolling to roll segments of the disk that overlap adjacent previously rolled segments. It will be noted that the floating ratchet ring 20 has eight teeth and that the hub of the drum 15 has sixteen teeth. So in skipping a tooth 27 just before the second rolling commences, the second rolling will be in segments that overlap previously rolled segments.

Figure 5:
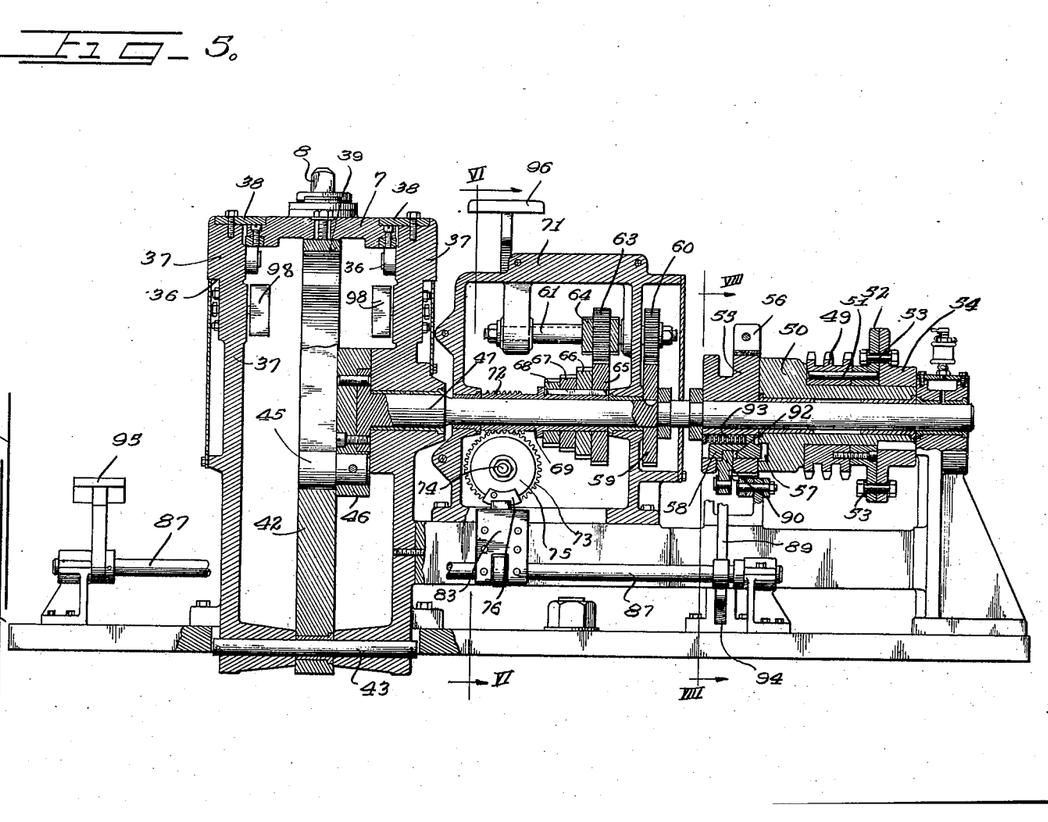
Figure 5 is an enlarged longitudinal sectional view through the driving mechanism that advances the carriage.

While the carriage 7 may be supported in various ways for reciprocating movements, it is preferably mounted upon rollers 36 carried by frame members 37 (Figures 1 and 5). Guide strip 38 attached to the top of the frame members 37 overlap the lateral margins of the carriage above the rollers 36 in order to maintain the carriage in its reciprocating movements.

As a segment of a disk is rolled from the center outwardly, the carriage is automatically moved toward the rear and when a segment has been thuswise rolled the carriage will have been shifted to its most rearward position. Mechanism has been provided for automatically shifting the carriage forwardly and rotating the disk A for rolling another segment. This mechanism will now be set forth. Upon the bottom of the rear portion of the carriage there is a block 39 (Figure 9) having a semi-circular notch 40 in its lower edge for receiving a curved head 41 on an operating yoke or lever 42 which is pivoted on a rod 43 (Figure 5) connecting the lower ends of the frame members 37. The lever 42 has a wrist pin slot 44 which is enlarged at its upper end as indicated at 44ᵃ. This enlarged portion 44ᵃ extends toward the right to allow the carriage to be freely shifted toward the left without being obstructed by the wrist pin 45 that engages in the slot. The wrist pin 45 is carried by a crank 46 secured upon a shaft 47 best shown in Figure 5. However, in the event that the carriage is not readily shifted backwards by the force of the rolls acting upon the blank, so that the rate of movement of the crank pin 45 to the left exceeds that of the lever 42 such crank pin will soon take up the lost motion due to the enlargement of the slot and engage the lever and positively force the same to the left for retracting the carriage. Thus the construction is such as to positively insure the return of the carriage to inoperative position by the crank pin in the event that the squeezing action of the rolls should fail to fully perform this function.

This shaft 47 which constitutes the feed drive shaft is suitably journaled in the frame work of the machine and is driven from a chain 48 (Figure 1) which engages a sprocket 49 loosely mounted upon a clutch sleeve 50 loose upon the shaft 47. A pin 51 connects the sprocket gear 49 with a flange member 52 which in turn is connected by shear pins 53 to a second flange member 54 which is keyed to the clutch sleeve 50. A cooperating clutch member 55 controlled by a brake 56 is secured upon the shaft 47 adjacent the forward end of the clutch sleeve 50 which is provided with a recess 57 for receiving an automatically operated clutch member 58 carried by the clutch member 55.

Figure 6:
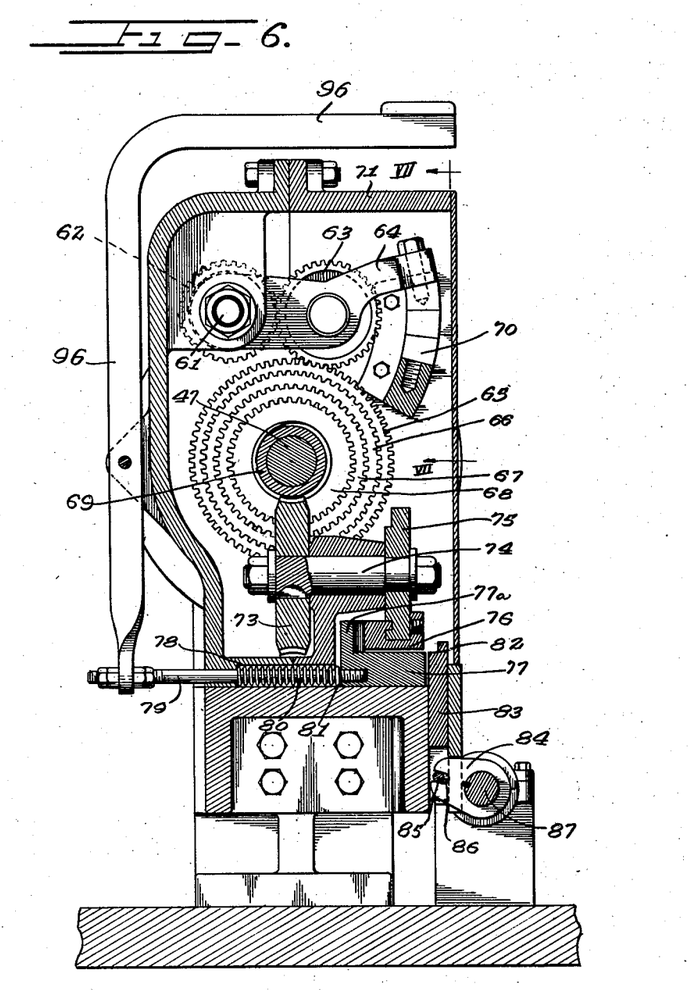
Figure 6 is an enlarged sectional view taken upon the line VI—VI of Figure 5.
Figure 7:
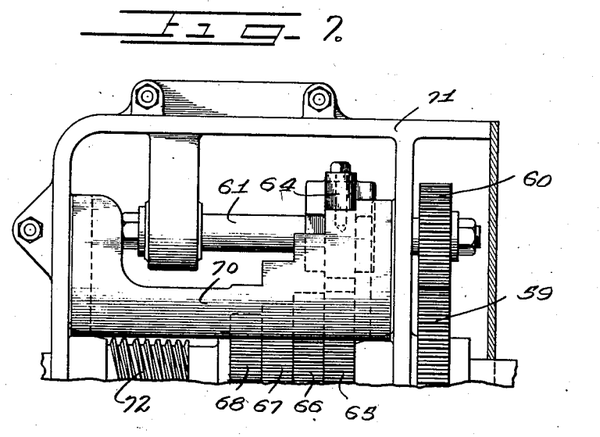
Figure 7 is a view taken upon the line VII—VII of Figure 6.

A gear 59 is keyed upon the shaft 47 in advance of the clutch and this gear meshes with a gear 60 secured upon a shaft 61 (Figures 6 and 7) journaled in brackets upon the casing 71. A gear 62 shown in dotted lines in Figure 6 is slidably splined upon the shaft 61 and meshes with a gear 63 journaled in a yoke 64 pivotally and slidably mounted upon the shaft 61. The gear 63 is adapted to be brought into meshing relation with any one of a series of graduated gears 65, 66, 67 and 68 which are keyed upon a sleeve 69 loosely mounted upon the shaft 47. The gear 62 and the yoke 64 may be longitudinally shifted upon shaft 61 to bring the gear 63 into engagement with any of the gears of the series to vary the speed. A stepped support 70 is secured upon the casing 71 for holding the outer end of the yoke in any of its shifted positions.

According to this arrangement different speeds may be imparted to the sleeve 69 which has a worm 72 thereon that meshes with a worm gear 73 keyed upon a stub shaft 74 (Figure 6) which is journaled in bearings upon the base of the machine. The shaft 74 has a disk 75 secured upon its end opposite the worm 73. A cam 76 is secured upon this disk for actuating a latch block 77 which has an upwardly directed flange 77a in the sphere of action of said cam 76. The base of the casing 71 has a cylindrical bore 78 through which a rod 79 extends that is threaded into the latch block 77. A coil spring 80 in said bore normally engages a collar 81 upon said rod for normally urging the latch block 77 to the right and shifting the same for engaging a rabbet 82 in a plunger arm 83 which is connected to a crank arm 84 by a pin 85 and slot 86 arrangement, when said plunger arm is in its lowered position.

The crank arm 84 is keyed upon a shaft 87, (Figure 5) which is journaled in suitable bearings upon the base of the machine.

The shaft 87 has a crank arm 88 thereon (Figure 8) which is connected to a link 89 that engages a clutch controlling member 90 pivoted to a bearing 91 upon the frame work of the machine. The member 90 is adapted for engaging a recess 92 in the clutch block 58 which is normally urged by a spring 93 into engagement with the recess 57 in the clutch member 50. This clutch mechanism is the well known punch press type.

Figures 8, 16:
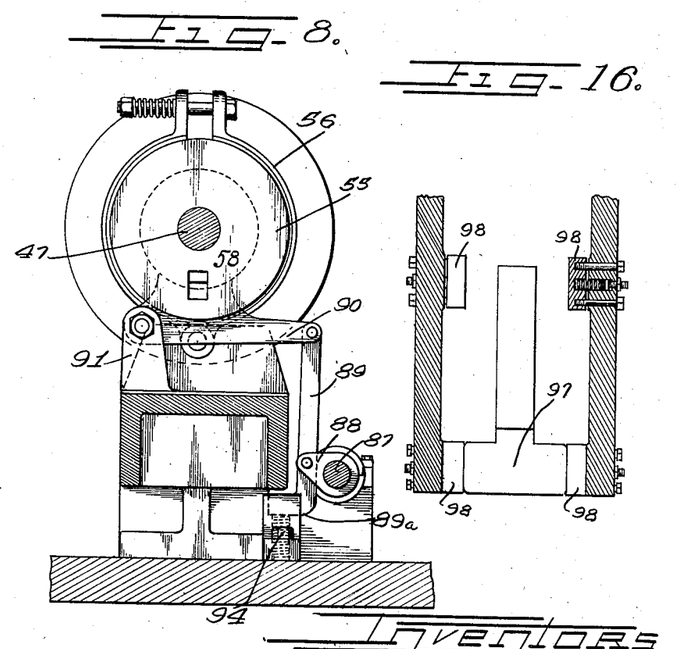
Figure 8 is an enlarged sectional view taken upon the line VIII—VIII of Figure 5.
Figure 16 is a view of the braking mechanism for the carriage.

The link 89 extends below the crank 88 as shown in Figure 8 and has a foot 89a normally engaged by a spring 94 for urging the link 89 upwardly and maintaining the clutch member 58 disengaged. The shaft 87 is provided with a foot pedal 95 (Figure 5) which may be manually actuated for starting the machine.

Figure 9:
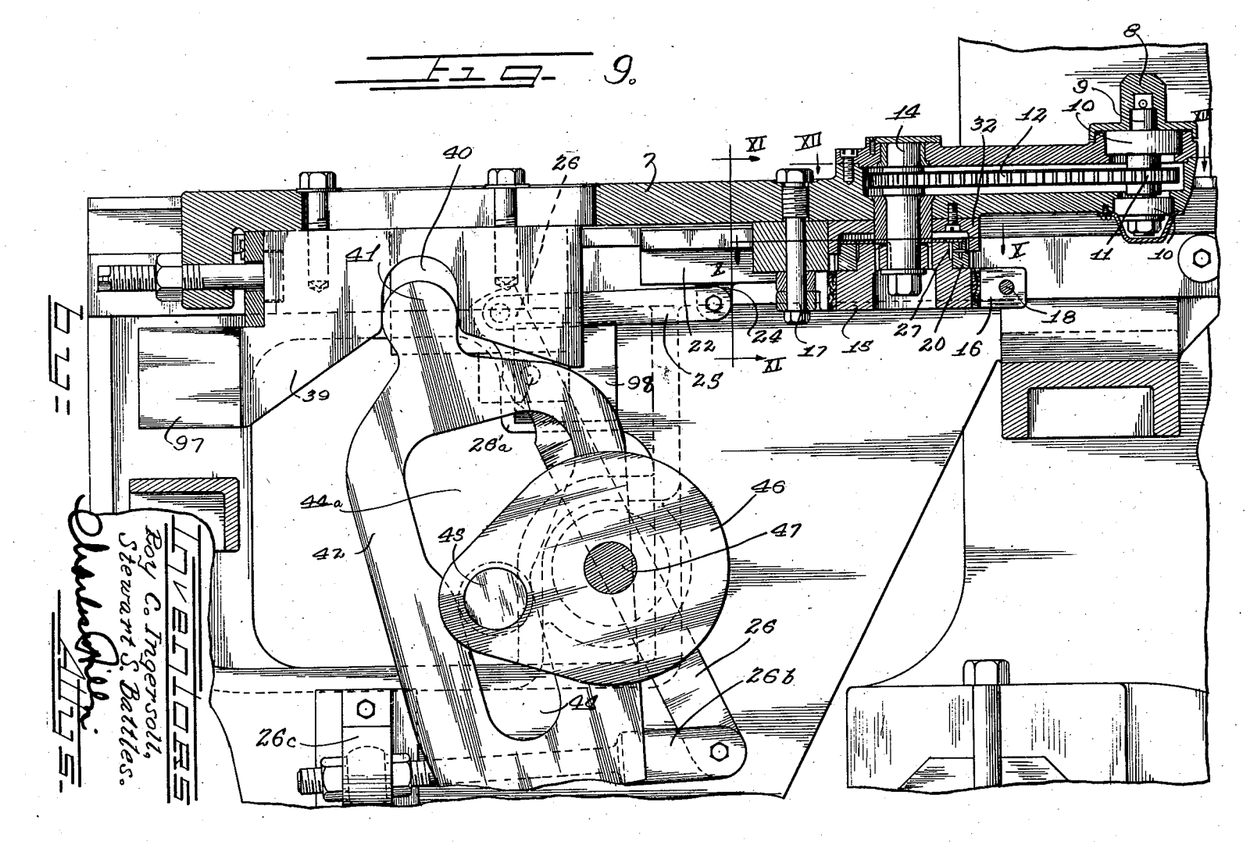
Figure 9 is an enlarged longitudinal sectional view through the carriage or work holder showing the operating parts therefor in elevation.

To start the machine, the foot pedal 95 may be actuated for rotating shaft 87 and drawing the clutch controlling member 90 and plunger arm 83 downwardly. As soon as these members have been drawn downwardly, the spring 93 will throw in the clutch member 58 and the spring 80 will slide the latch block 77 over the plunger arm 83. If it is desired to stop the machine in case of emergency or accident, at once, the lever 96 (Figure 6) may be actuated for withdrawing the latch block 77 and allowing spring 94 to actuate the parts 89 and 90 for throwing out the clutch. This lever 96 is pivoted intermediate its ends upon a lug extending from the casing 71. Its lower end is bolted to the rod 79 while its upper end extends at right angles over the casing. It is merely necessary to depress the upper end to throw out the clutch. Mechanism has been provided for frictionally retaining the aforementioned carriage at both ends of its reciprocating stroke. This mechanism is best illustrated in Figures 5, 9 and 16 and in referring to these figures it will be observed that the block 39 on the carriage has a laterally extending head 97 and that the frame members 37 have resilient pads 98 arranged in opposed pairs at suitable intervals between which the head 97 engages when the carriage is at either end of its stroke.

Power is adapted to be applied to one of the intergeared gap roll shafts 1 or 2 for rotating the same. The feed shaft 47 is connected by the sprocket chain to a source of power which is preferably the lower roll shaft 2 as shown in Figure 1. The clutch sleeve 50 on the feed shaft will idly rotate upon shaft 47 until it is connected to the clutch member 55 when shaft 47 will also be driven. To connect the clutch members 50 and 55, the foot pedal 93 on shaft 87 is operated for rocking shaft 87. As shaft 87 is rocked in the proper direction, the clutch control member 90 will be drawn downwardly for allowing spring 93 to force the clutch block 58 into recess 57 of the clutch member 50. At the same time that the shaft 87 is rocked, the plunger 83 will be drawn downwardly allowing spring 80 to project the block 77 to the right and into engagement with the rabbet in the top of the plunger 83, and bring the cam thereon into the path of the cam 76 on disk 75.

When clutch members 50 and 55 are connected as above explained, shaft 47 will be rotated. The rotation of shaft 47 will oscillate lever 42 for advancing the carriage and rotating the blank supporting stud 8 a fraction of a revolution through the aforedescribed mechanisms. The carriage will be advanced by this movement to bring the blank into operative relation with the gap rolls. The gap rolls will roll a segment of the blank from a point adjacent the center thereof to the periphery thereof. During this rolling operation, the carriage will be freely shifted to the left. When a segment has been thuswise rolled, the shafts 1 and 2 will rotate a half of a revolution before another pair of roll blocks 5 will rotate into position to engage the blank and during this period the carriage will have been again advanced and the blank support thereon will have been rotated a fraction of a revolution equal in the present case to one eighth of a revolution to again bring the blank into operative relation with the gap rolls for rolling an adjacent segment.

After the blank has been thuswise rolled in eight equal segments, the cam pin 31 will be engaged by the pawl 28 which will be held out of engagement with ratchet teeth 27 until there has been a skip of one tooth equal to one sixteenth of a revolution. When a tooth 27 has been skipped the pawl 28 will have rotated clear of cam pin 31 and will again be forced into engagement with the ratchet by leaf spring 30. This skipping of a ratchet tooth 27 will only rotate the blank one sixteenth of a revolution. The blank is now rerolled in a manner similar to the first rolling. However, as the blank has only been rotated one sixteenth of a revolution before the re-rolling begins, the first segment rerolled will consist of one-half of the eighth or last segment rolled and one half of the first segment rolled. Consequently, during the re-rolling, the blank will be rolled upon segments that overlap previously rolled segments.

When the blank has been re-rolled in eight equal segments overlapping previously rolled segments, the worm gear 73 will have made one revolution to cause cam disk 75 to withdraw the latch block 77 and allow the clutch control member 90 to be elevated for disengaging the clutch block 58 and stopping the rotation of the feed shaft 47.

From the foregoing, it will be evident that a novel automatic apparatus has been invented for rolling metal articles and then rerolling the same upon segments overlapping the first rolled segments, and in which the indexing mechanism for the disks operates so as to automatically produce the proper operation of the parts for thuswise rolling the disks.

We are aware that many changes may be made and numerous details of construction may be varied through a wide range without departing from the principles of this invention, and we, therefore, do not purpose limiting the patent granted hereon otherwise than necessitated by the prior art.

We claim as follows:

1. In a disk rolling machine, a reciprocable carriage, a rotatable workholder on said carriage, gearing on said carriage connected to said workholder, means for operating said gearing including a pair of concentric ratchet devices, a pawl connecting said devices and cam means in the path of said pawl for temporarily disengaging the same from the inner ratchet device after a predetermined rotation of said ratchet device.

2. In a disk rolling machine, a pair of gap rolls, a carriage, a workholder on said carriage means including a shaft for advancing said carriage, gearing for operating said shaft including a pair of connected clutch members, mechanism for disconnecting said clutch members at a predetermined time including a variable transmission for changing such predetermined time.

3. In a machine of the class described, a pair of rolls, a carriage movable toward and from said rolls, means for operating said carriage including a shaft and a pair of normally connected clutch members, and mechanism automatically operable at a predetermined time for disconnecting said clutch members, said mechanism including a variable transmission for varying such predetermined time.

4. In a machine of the class described, a pair of rolls, a carriage movable toward and from said rolls, means for moving said carriage in one direction including a shaft and a pair of connected clutch members on said shaft, a member for disconnecting said clutch members, and means including a variable transmission for operating said member for disconnecting said clutch members at different predetermined times.

5. In a machine of the class described, the combination with rolling means, of a carriage movable toward and from said rolling means, a rotatable workholder on said carriage, mechanism for indexing said workholder, a plurality of equal spaces during the movements of the carriage in one direction including a pair of movable members, a driving connection between said members and means for temporarily rendering said driving connection inoperative when said plurality of spaces have been indexed for skipping a fraction of a space.

6. In a disk rolling machine, a pair of gap rolls, a reciprocable carriage, means for moving said carriage toward said rolls, a rotatable disk support upon said carriage, indexing means for imparting a partial rotation to said disk support during the movement of said carriage toward said rolls and a device for causing said indexing means to index said work holder a different extent after a revolution of said workholder.

7. In a disk rolling machine, the combination with rolling means, of a reciprocable carriage, means for moving said carriage toward said rolls, a rotatable work holder upon said carriage, means for indexing said work holder a predetermined extent during the movement of said carriage toward said rolls and a device for causing said indexing means to index said work holder a different extent after a predetermined number of reciprocations of said carriage.

8. In a machine of the class described, the combination with rolling means, a work holder cooperating therewith, means for indexing said work holder, a plurality of equal spaces and a device for causing said indexing means to index said work holder a different space at the end of said plurality of equal spaces.

9. In a disk rolling machine, the combination with rolling means, of a disk support cooperating therewith, means for rotating said disk support for rolling adjacent segments of said disk and a device for causing said indexing means to rotate said disk support a different extent at the end of a revolution of such support for rolling segments overlapping previously rolled segments.

10. In a disk rolling machine, the combination with rolling means, of a reciprocable carriage, a rotatable work holder upon said carriage, means for moving said carriage toward said rolling means, means for indexing said work holder during the movement of said carriage toward said rolls for rolling adjacent segments on said disk and a device for causing said indexing means to index said work holder a different extent at the end of a revolution thereof for rolling segments overlapping previously rolled segments.

11. In a disk rolling machine, gap rolls, a reciprocable carriage, a work holder upon said carriage, means for moving said carriage toward said rolls, gearing carried by said carriage and connected to said work holder, means set in motion by the movement of said carriage for operating said gearing a predetermined extent, said means embodying a pair of coacting members said means for temporarily disengaging said members after a revolution of said work holder.

12. In a disk rolling machine, a pair of gap rolls, a carriage movable toward and from said rolls, a disk support upon said carriage, means for indexing said disk support during the movement of the carriage in one direction, and said indexing means having means for varying the indexing of said disk support.

13. In a machine of the class described, a pair of gap rolls, a carriage movable toward and from said rolls, means including a feed shaft for shifting said carriage toward said rolls, said means embodying a pair of clutch members and means including a variable transmission for operating said clutch members for varying the period of operation of said shaft.

14. In a machine of the class described, a reciprocating carriage, a lever pivoted at one end and connected at its other end to said carriage, said lever having a crank pin slot with an enlargement, a shaft, a crank upon said shaft, a pin upon said crank and extending into said slot for advancing said carriage, said pin rotating into the enlargement of said slot when said carriage has been advanced, and rotating through said enlargement for positively retracting said lever under predetermined conditions.

15. In a machine of the class described, a pair of gap rolls, a reciprocable carriage, a support upon said carriage for sustaining a blank to be acted upon by said rolls, means for advancing the carriage to present the blank to the rolls, the action of the rolls normally tending to shift the carriage toward inoperative position, said means including a crank having a lost motion connection with said carriage to allow the action of said rolls to return said carriage, said crank being susceptible of taking up said lost motion and positively retracting said carriage in the event that the action of the rolls fails to readily return the carriage.

16. In a disk rolling machine, a pair of gap rolls, a reciprocating carriage, means on said carriage for supporting a blank to be acted upon by said rolls, means for advancing said carriage toward said rolls, the action of the rolls on a disk tending to force the carriage in a direction away from the rolls, said second mentioned means including a pair of coacting members having a lost motion connection to allow said carriage to freely move away from the rolls, said coacting members being constructed to take up such lost motion for positively returning the carriage in the event that it does not freely return.

17. In a machine of the class described, a reciprocating carriage, a lever pivoted at one end and connected at its other end to said carriage, said lever having an intermediate slot with an enlarged portion, a shaft, a crank upon said shaft, a pin upon said crank extending into said slot and engaging in such slot for advancing said carriage in one direction and rotating into said enlarged portion when said carriage is advanced whereby said carriage may freely return, said crank rotating through said enlarged portion and positively actuating said lever for retracting the carriage in the event that it does not freely return, means for driving said shaft and means for stopping the same after a predetermined number of revolutions.

18. In a machine of the class described, a pair of gap rolls, a carriage movable toward and from said rolls, means including a feed shaft for shifting said carriage, said means embodying coacting clutch members, means for operating said shaft, and mechanism for disengaging said clutch members including a variable transmission operated by said feed shaft.

19. In a machine of the class described, a pair of gap rolls, a carriage movable toward and from said rolls, means including a feed shaft for moving said carriage, means for driving said feed shaft including a movable clutch element, mechanism for moving said clutch element to inoperative position including a variable transmission operated by said shaft for varying the period of operation of said shaft.

ROY C. INGERSOLL.
STEWART S. BATTLES.